United States Patent
Lahde et al.

(10) Patent No.: US 7,076,788 B1
(45) Date of Patent: Jul. 11, 2006

(54) METHOD FOR DESCRIBING SOFTWARE ARCHITECTURE

(75) Inventors: Eero Lahde, Valkeakoski (FI);
Juhapekka Niemi, Tampere (FI);
Tommi Mikkonen, Tampere (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/432,045

(22) Filed: Nov. 1, 1999

(51) Int. Cl.
*G06F 9/00* (2006.01)
(52) U.S. Cl. ...................... 719/328; 717/123
(58) Field of Classification Search ............... 717/106, 717/107, 120, 123, 108, 116, 118, 147; 719/328
See application file for complete search history.

(56) References Cited

U.S. PATENT DOCUMENTS

| | | | | |
|---|---|---|---|---|
| 5,067,072 A | * | 11/1991 | Talati et al. ................. | 717/148 |
| 5,815,718 A | * | 9/1998 | Tock ........................... | 717/166 |
| 5,875,330 A | | 2/1999 | Goti | |
| 5,953,526 A | * | 9/1999 | Day et al. .................... | 717/108 |
| 5,987,247 A | * | 11/1999 | Lau ............................. | 717/100 |
| 6,083,276 A | * | 7/2000 | Davidson et al. ............ | 717/107 |
| 6,096,095 A | * | 8/2000 | Halstead ...................... | 717/107 |
| 6,253,369 B1 | * | 6/2001 | Cloud et al. ................. | 717/136 |
| 6,442,748 B1 | * | 8/2002 | Bowman-Amuah ......... | 717/108 |
| 6,542,885 B1 | * | 4/2003 | Nally et al. ................... | 707/2 |
| 6,598,220 B1 | * | 7/2003 | Valys et al. .................. | 717/116 |

FOREIGN PATENT DOCUMENTS

| EP | 0 540 487 A2 | 5/1993 |
|---|---|---|
| EP | 0 640 914 A2 | 1/1995 |

\* cited by examiner

*Primary Examiner*—William Thomson
*Assistant Examiner*—Phuong N. Hoang
(74) *Attorney, Agent, or Firm*—Cohen, Pontani, Lieberman & Pavane

(57) ABSTRACT

A method for describing software architecture utilizes a service concept to provide a map of the software system's features from top-level functionalities to actual code through all intermediate abstractions. The services are defined as logical and physical services. Physical services are bound to a given level of abstraction by the actual implementation, whereas logical services can be hierarchically divided into smaller logical services. A suitable abstraction level can be used for the logical services so that the best match between physical and logical services can be achieved. Linking physical services to logical services is done so that the set of physical services that implement a set of logical services can be found in a top-down fashion. Also the set of logical services that is implemented by a set of physical services can be found in the bottom-up fashion. The logical service structure can be used as a reference software architecture.

7 Claims, 3 Drawing Sheets

METHOD FOR DESCRIBING SOFTWARE ARCHITECTURE

BACKGROUND OF THE INVENTION

1. Field of the Invention

The present invention relates to software architectures, and more particularly, it relates to a method for describing software system architecture in terms of services at different abstraction levels.

2. Description of the Related Art

Software systems are generally made up of several different parts that interact with each other as required to perform a particular task. These different parts are referred to as parties or software (SW) artifacts that are generally designed together to make up the entire software architecture. The software architecture is formed with a hierarchy of SW artifacts that operate at different abstraction levels. The relationship between the system abstractions becomes an important factor when attempting to modify the software system to perform newly desired tasks.

Each modification made to an existing software system results in the evolution of that software system into a more complex system. This is particularly the case when taking into consideration the conceptual abstractions that make up the system, and is primarily due to the fact that modifications to an existing system are seldom such that they cleanly fit into the scope of the originally included abstractions. Instead, existing abstractions are often compromised or invalidated in order to facilitate new requirements to which the system is to be subjected. This results in potential downgrading or decreased dependability of the software system. In addition, the rework needed for correcting the abstractions may not be an option due to the time schedule for implementing the modifications and returning the product to market (i.e., time-to-market) or lack of development resources. Additional difficulties may arise due to the fact that sometimes fundamental abstractions need to be sacrificed even at the very beginning of software system development as a result of performance requirements which, for example, may lead to tightly coupled applications and poorly defined abstractions even in the early phases of a products life.

As the need for modifications, enhancements, or new features increases, the abstractions used as a basis for the software applications of the system usually become fragile. These abstractions are often augmented with extensions and exceptions that logically belong to the scope of some other abstraction(s), but due to the performance or resourcing reasons, need to be implemented as a special case of a certain abstraction. In addition, as different software artifacts that cooperatively constitute the system are maintained in parallel, the manner in which modifications are implemented and documented tends to diverge between the artifacts. This divergence does not help in the specification and implementation of new features, which typically requires interaction of artifacts and the abstractions included in them. Moreover, for large legacy systems, a serious dependability risk arises.

An alternative solution for the introduction of higher-level abstractions would be to use a layered architecture, with the top layers controlling lower layers. However, an introduction of such an architecture at this point in current day systems and scenarios would require massive rewriting of already verified and validated code as well as result in potentially unacceptable loss of performance. Therefore, centralized abstractions of distributed behaviors are adopted rather than incorporating everything into the physical structure of the software. The role of abstractions is then restricted to the facilitation of the modifications made in the actual code.

SUMMARY OF THE INVENTION

It is an object of the present invention to provide a method for describing software systems and architecture that facilitates the evolution and maintenance of one continuously modified dependable software system.

It is another object of the present invention to provide a method for describing software systems and architecture that creates one central abstraction framework for the entire software architecture that can be scaled to different needs ranging from basic features, top-level functionalities and application-level operations to directly implementable code.

It is yet another object of the invention to provide a method for describing and documenting software systems and architecture that enables the determination of the scope and effects of a desired modification and thereby enables an estimation of the cost and possible difficulty of its introduction and implementation into the software system architecture.

It is a further object of the invention to provide a method for describing and documenting software systems and architecture which enables the assessment of the status of the SW architecture itself (using the architecture description to find changes to the architecture).

In accordance with an embodiment of the present invention, the concept of a service is introduced. A service denotes a collaboration between different software artifacts of the software architecture at varying levels of abstractions. This service concept provides the ability to trace identified services from one abstraction level to another within the software system, which supports the mapping of features to code and vice versa.

According to a preferred embodiment, the method for describing software architecture comprises steps such as determining interfaces between software artifacts that make up the software architecture and structuring the determined interfaces into basic dialogues. The dialogues are recorded or written in formal definitions of each, and the purpose and usage of dialogues and interactions as services are documented. Each logical service is then mapped to each physical service used in its implementation, and a determination is made as to whether the mapping is simple enough. When the mapping is simple enough, it is formally documented.

Prior to the documentation of purpose and usage of the dialogues, a determination is made as to the interactions between applications within the system. The determined interactions become logical services and are defined and utilized in the documentation of the purpose and usage of the dialogues (i.e., interactions between applications refer to the abstract part and become logical services).

For example, the present invention enables the identification of the various levels of functionality of the software system and the software components that make up these identified levels of functionality. Once the individual software components of the various levels are identified, the interactions and relationships between the respective components are identified and documented. As a result, a map of the hierarchy of the software system and all relationships between the respective components that make up the system can be created and documented. This map provides a clear and predictable manner in which to implement modifications to the software system and components thereof, and thereby increases efficiency in modification and further development of these systems, as well as enabling the assessment of the architecture.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are merely intended to conceptually illustrate the structures and procedures described herein.

DETAILED DESCRIPTION OF THE PRESENTLY PREFERRED EMBODIMENTS

Service View to a System

A software system viewed through services consists of processes or other SW artifacts communicating with each other using some synchronous or asynchronous interface, such as procedure calls or messages. The benefits of the service view can be best seen in a large system of several million lines of code, where the code typically includes about a dozen main applications. Different applications have typically adopted diverging philosophies in the use of messages and data included in them, resulting in the lack of clear interfaces between some of the applications. This in turn makes further development of the applications a task that cannot be easily carried out in a modular and predictable fashion.

The present invention creates a way to access the system that is different from conventional program modules. It enables easier evolution of the system, as modifications can be specified and implemented in a rigorously traceable fashion, with the trace starting from the features involved and ending at the final code. Basically, the introduction of the service concept of the present invention can thus be seen as the creation of a map from features and top-level functionalities to actual code through intermediate service abstractions.

The service concept of the present invention provides a natural framework for abstract description of features as well. The dynamic aspect of features can be described in terms of the description of the usage of services from a control point of view. Provided with such descriptions, feature interworking becomes more manageable, as it is possible to automatically pinpoint the services shared by the features. Moreover, once provided with a service hierarchy, it is easier to predict what is required to incorporate a new feature, because existing services can be re-used without going to the implementation details of individual software components. Based on this, the service hierarchy can also be used to form the structure of documentation of the static aspects of the system.

Scalability Through Hierarchy of Abstractions

Figure 1:
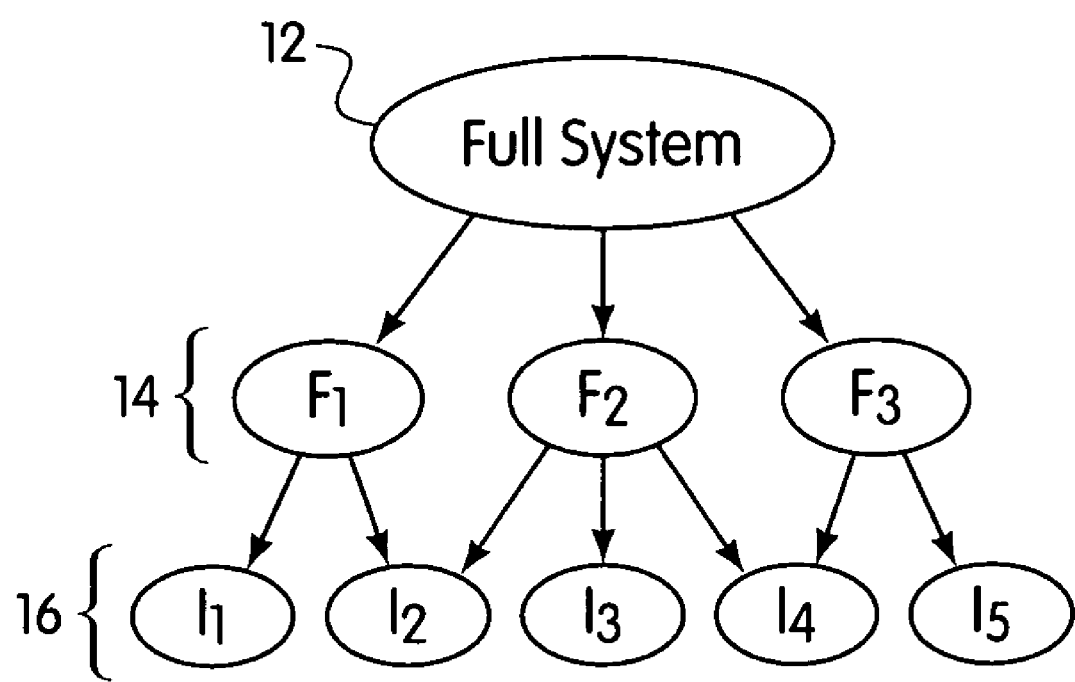
FIG. 1 is a diagram of a system hierarchy.

By allowing recursive use of the service of the present invention, all levels of abstraction can utilize the same basic concept. Typical software systems can be broken up into a hierarchy of related services. Referring to FIG. 1, the root node of a hierarchy is the full system 12, followed by services 14 representing features, top-level functionalities or programs. At the end of the hierarchy, is a level of implementations 16 given, for instance, with event traces or scenarios. The hierarchy of services enables straightforward representation of the software system in terms of services at different levels of abstraction. Due to the abstract descriptions, re-use of the software is supported at multiple levels of abstraction, i.e., any level of abstraction in the hierarchy can be used as a basis for re-use.

As shown, a system can be seen as a non-cyclic graph, where each node is a service, where three levels of abstraction are used, and $F_i$ is used to denote feature-level services, and $I_j$ is used to denote implementation level services. As indicated, lower-level services 16 can be shared by one or more of the higher-level services 14, in which case they may represent, for example, some kind of a library of files or programs.

As used herein, the lowest-level services 16 are referred to as "physical services" to highlight the fact that they represent the system at the level of abstraction that can be implemented in a straightforward fashion (i.e., by code). Services that are not physical are referred to as "logical services" or "virtual services", reflecting their role as abstractions defined in terms of logical or physical services rather than actual sequences of code in different implementation modules. In terms of the service hierarchy graph of FIG. 1, logical or virtual services are included in the hierarchy as nodes that have at least one child node (i.e., top-level features or functionalities 14), whereas nodes representing physical services never have child nodes (i.e., the level of functionalities 16). This resembles a composition commonly associated with connectors in architectural descriptions.

The granularity or differences between services is a design decision. Generally, there is some degree of transiency associated with physical services. Thus, an execution of a physical service more or less takes place in "one shot". For logical services however, a variety of criteria is generally required. For example, a logical service can be a generalization of the properties of a set of lower-level services, or as a set of operations that needs to be sequentially executed.

Handling Dynamics

The service hierarchy described above defines the static structure of services, which, however, is not enough for high-level specification. Instead, information on dynamic properties in the model should also be included. In practice, behavioral descriptions of services must be supported. Generally, software systems are comprised of behaviors (e.g., applications that perform specific operations) which work together to perform one or more tasks. It is the implementation and organization of these behaviors employed during software development that usually involves some kind of sharing of responsibilities based on a structural decomposition of the system. The services of the present invention can express operations that require several components in an implementation-independent fashion. For example, these operations typically represent file accesses and procedure calls, which all can be expressed in a similar fashion at a high level of abstraction.

For physical services, the notion of sequence diagrams as defined in common object-oriented context is adopted. This enables the definition of the sequence of events needed for implementing a primitive operation between different SW artifacts. For logical services, state machines or other diagrams or descriptions can be used to define the logic of the services at an abstraction level higher than that of the implementation. State transitions can be augmented with service names, denoting service executions in the context of the higher-level service. This helps in relating the higher-level services with their implementations.

Figure 2:
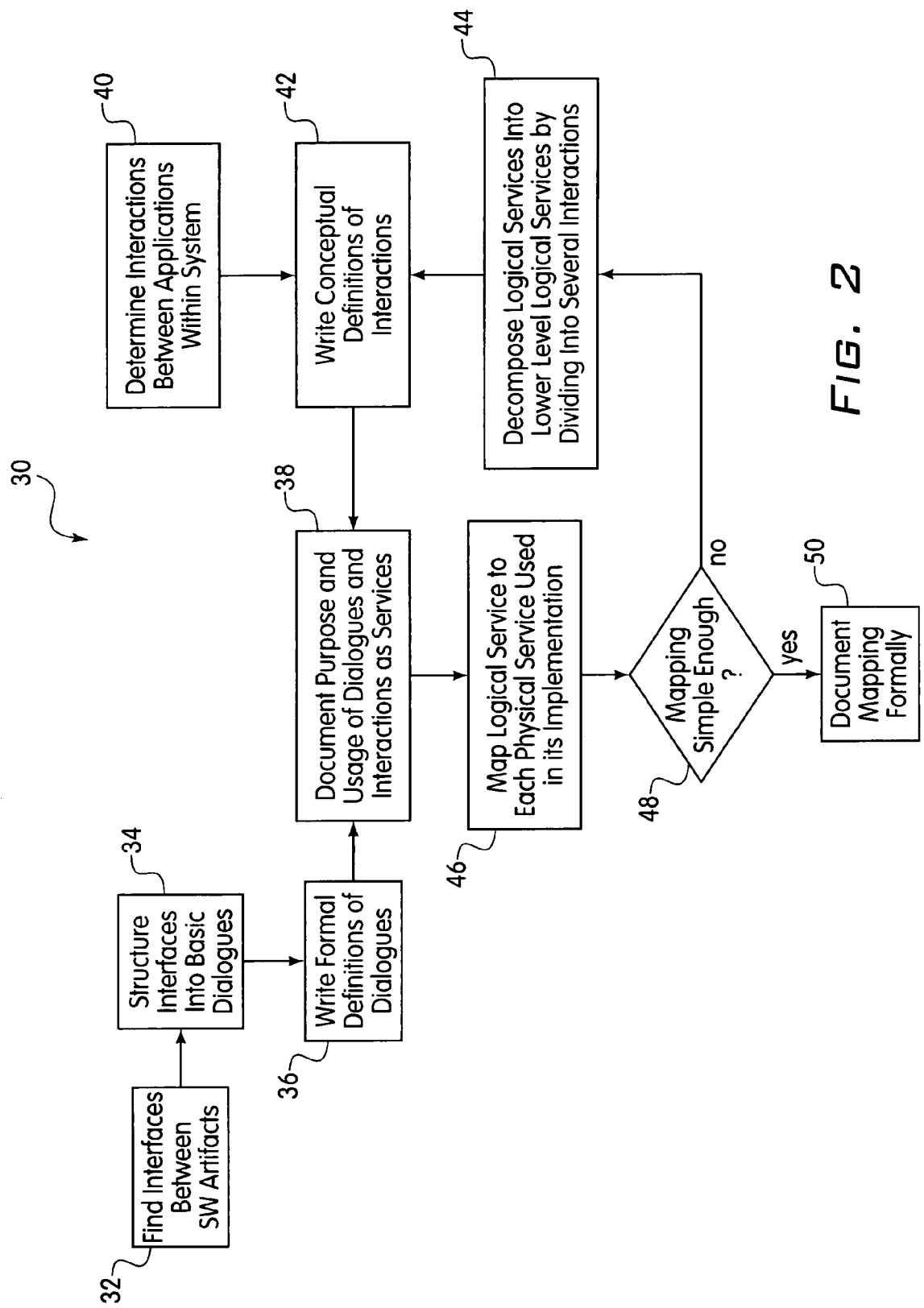
FIG. 2 is a flow diagram of the method for describing software architecture in accordance with an embodiment of the present invention.

FIG. 2 shows a flow diagram illustrating the method 30 for describing software architecture in accordance with an embodiment of the present invention, wherein a service hierarchy of the software architecture is created. Initially, the introduction of services starts from the levels of abstraction that are the most obvious ones (i.e., the code or SW artifacts implementing physical services in bottom-up fashion and logical services in top-down fashion at the level of different applications). The SW designer can make this initial identification of the levels of abstractions. Determinations are then made to find the interfaces between SW artifacts (step 32) of the system by listing the SW artifacts and identifying where there is communication between two SW artifacts, and to identify the interactions between applications within the system (step 40) by going through different use cases of the system and determining where interactions between applications occur. Once the interfaces between software artifacts has been determined, they are structured into basic dialogues (step 34) described, for example, in terms of sequence diagrams (written to memory). The basic dialogues are then formally defined (step 36). At the same time, the conceptual definitions of the determined interactions between applications are written (step 42) to, for example, a database. Using the formal definitions of dialogues and conceptual definitions of interactions, the purpose and usage of the dialogues and interactions are documented as services in the system (step 38). Once the purpose and usage of the dialogues and interactions are documented as services in the system, the logical services are mapped to each physical service used in its implementation using, for example, a database (step 46). Thus, the most straightforward task is to map implementation-level operations to their corresponding physical services. This basically means that different messages or for example, subroutine calls, used in the system are grouped together into groups which are used to accomplish coherent tasks in the code. These groupings are then defined as physical services. Although this is a simple task in principle, practical problems arise due to the fact that sometimes several messages are required to implement one physical service, whereas in some other situations, only one message is required to implement several physical services.

Upon identifying the intermediate logical services and corresponding physical services (i.e., corresponding abstraction levels), the next step is to connect them by composing the intermediate logical services in the hierarchy. In the present case, the number of intermediate levels is typically assumed to range from zero through five, with top values only being used in the most complex applications. However, more than five levels can be achieved which would result in an exponential increase in the number of logical services. As such, it is preferable to have zero—five intermediate levels.

A determination must then be made at this point as to whether the previous mapping is simple enough (step 48). A mapping is considered simple enough when each logical service is implemented by as few physical services and each physical service participates in implementing as few logical services as possible. In other words, the mapping of n physical services to m logical services is considered simple when n and m are as small as possible. By way of example, a 1 to 1 mapping would be the simplest, but is not always accessible. The next desirable case would be where n or n=1 and the other of n and m would be less than 5. When the mapping is simple enough, it is formally documented (step 50). In the event that the mapping is not simple enough (meaning that there are more physical services participating in the implementation of a given logical service than already accounted for) at this point (i.e., step 48), the logical services are decomposed into lower level logical services by dividing them into several interactions which become logical services (step 44). Once decomposed, the lower level logical services are utilized in the writing of conceptual definitions of the interactions (at step 42). Steps 38, 46, and 48 are repeated until the mapping is simple enough to result in a formally documented map of the software architecture. The formally documented map generated at step 50 is the service hierarchy of the subject software architecture. The diagram of FIG. 1 shows an example of a service hierarchy having only two levels. One of ordinary skill will recognize that other systems may include many more levels and that the system shown in FIG. 1 is for exemplary purposes only.

In addition to a uniform description for different implementations, restructuring with the services concept of the present invention thus helps to identify potential problem situations with regard to the actual code by analyzing whether the n:m mapping from logical to physical services in the service hierarchy the mapping differs most from a 1:1 ratio. This could mean, for example, that a logical service is implemented as several small parts distributed over the system, or that one physical service is used for many different purposes. Either of these cases are undesirable.

Development with Services

Figure 3:
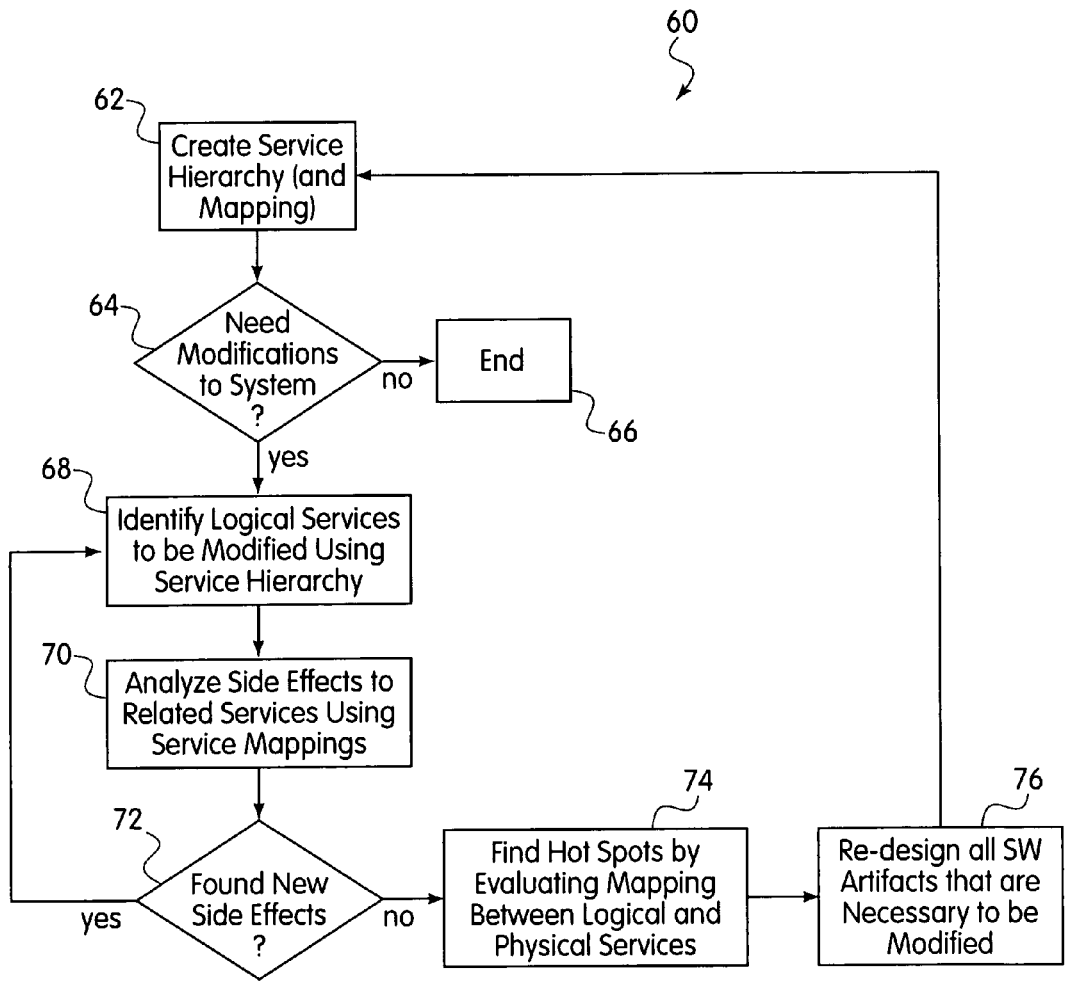
FIG. 3 is a flow diagram of the method for using the created description of the SW architecture in accordance with another embodiment of the present invention.

In accordance with another embodiment, the services of the present invention can provide a uniform view to the system at different phases of the development. This obviously includes the phases of the development including specification, implementation, and testing. FIG. 3 shows a flow diagram of the implementation of the service concept of the present invention into the development of the software architecture. When dealing with an existing software architecture, the service hierarchy must be created and mapped (step 62) as described with reference to FIG. 2. Once the service hierarchy has been obtained, a determination is made as to whether modifications to the system are required (step 64). A modification may be needed due to new functional or non-functional requirements or problems with the existing SW architecture. Obviously if none are required, the process ends (step 66). Assuming modifications are desired, the logical services to be modified are identified using the previously created service hierarchy (step 68). Upon identification of the logical services to be modified, an analysis of the side effects to the related services (i.e., related to the identified logical services) is performed using the service mappings (step 70). Side effects occur when a physical service participates in implementing several logical services If any new side effects are determined to be present (step 72), the process returns to step 68 where the logical services to be modified are further identified. When no new side effects are present (step 72), potential places for troubble (or potential problem situations as described previously) are determined by evaluating the previously defined mapping between logical and physical services (step 74). Upon determination of these so called "hot spots", all SW artifacts that are necessary to be modified are re-designed and the process returns to step 62 to begin again should another modification be required or desired.

As described, during the specification phase of software development, logical services to be implemented or to be modified are identified (step 68), together with the neighboring services in the service hierarchy. Then, the services are implemented, and ultimately can be used to ensure that all necessary parts are tested whenever new features are incorporated in the system. Additional tools can be implemented to trace services at different levels of abstraction, further facilitating the software system's evolution. In addition to activities related to the development, the service concept of the present invention can be used as the basis for configuration management. This supports feature-based delivery, because the relation of features and actual code is easier to master with a service hierarchy.

Specifications use services to identify the common parts of behavior that different features require in their implementation. In practice, this means that new features can be built by re-using existing services (an also creating new ones in some cases), and existing features can be modified by composing new variants of some of the services used in their implementation.

The implementation of services for updating an existing system or developing a new software system is a relatively straightforward task. Upon composing the specifications, the structures of different services have been defined, and the only thing to do is to map the services to code. In situations where the control of the service has been distributed in several components, developers need to cooperate in order to compose the implementation. As the services of the present invention can be seen as definitions of inputs and outputs for different operations, one of ordinary skill in the art will recognize that there is obvious support for the development of test cases.

While there have shown and described and pointed out fundamental novel features of the invention as applied to preferred embodiments thereof, it will be understood that various omissions and substitutions and changes in the form and details of the methods disclosed and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A method for describing a software architecture of a software system in terms of behavioral descriptions for facilitating the evolution and maintenance of the software system during continuous modification, the software architecture having a hierarchy of software artifacts that operate at different abstraction levels, said method comprising the steps of:

identifying the software artifacts that make up the hierarchy of software artifacts in the software architecture that operate at different abstraction levels, wherein the abstraction levels include lower and higher levels, said lower abstraction level software artifacts comprising sequences of code and said higher abstraction level software artifacts defining services;

determining interfaces between the identified software artifacts;

structuring the interfaces into dialogues, wherein each of said dialogues define a behavioral description of the software architecture in terms of a sequence diagram of interactions between the software artifacts at the different abstraction levels for performing a specific operation;

defining the dialogues; and documenting the purpose and usage of the dialogues as physical services.

2. The method set forth in claim 1, further comprising:

determining interactions between applications within the software architecture; and generating conceptual definitions of the interactions as logical services;

wherein said step of documenting utilizes the conceptual definitions of the interactions in conjunction with said defined dialogues to document the purpose and usage of the respective services.

3. The method set forth in claim 2, further comprising:

mapping logical services to each physical service used in its implementation;

determining whether said step of mapping generates a sufficiently simple map based on relationships between the logical and physical services; and documenting said map when it has been determined to be sufficiently simple.

4. The method set forth in claim 3, further comprising decomposing the logical services into lower level logical services by dividing them into several interactions, said step of decomposing being performed when said map is determined to be insufficiently simple.

5. The method set forth in claim 3, wherein said step of determining returns a result of a sufficiently simple map when each logical service is implemented by as few physical services as possible and each physical service participates in as few logical services as possible.

6. The method set forth in claim 3, wherein said step of determining returns a result of an insufficiently simple map when each logical service is not implemented by as few physical services as possible.

7. The method set forth in claim 3, wherein said step of determining returns a result of an insufficiently simple map when each physical service does not participate in as few logical services as possible.

* * * * *